US010257027B2

(12) United States Patent
Bigian et al.

(10) Patent No.: US 10,257,027 B2
(45) Date of Patent: Apr. 9, 2019

(54) CONTENT SWITCH MANAGEMENT

(71) Applicant: eBay Inc., San Jose, CA (US)

(72) Inventors: Armond Bigian, San Jose, CA (US); John T. Feldmeier, Palo Alto, CA (US); Connie W. Yang, Saratoga, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 14/611,217

(22) Filed: Jan. 31, 2015

(65) Prior Publication Data
US 2015/0149604 A1 May 28, 2015

Related U.S. Application Data

(63) Continuation of application No. 11/616,731, filed on Dec. 27, 2006, now Pat. No. 8,949,297.

(51) Int. Cl.
*H04L 12/24* (2006.01)
*H04L 29/08* (2006.01)

(52) U.S. Cl.
CPC .......... *H04L 41/0803* (2013.01); *H04L 67/14* (2013.01)

(58) Field of Classification Search
CPC ... H04L 41/08; H04L 41/0803; H04L 41/085; H04L 41/0853; H04L 41/0856; H04L 41/0859; H04L 41/0866; H04L 41/0869; H04L 41/0873; H04L 67/14
See application file for complete search history.

(56) References Cited

U.S. PATENT DOCUMENTS

| | | | |
|---|---|---|---|
| 5,768,520 A | 6/1998 | Dan et al. | |
| 5,838,907 A * | 11/1998 | Hansen | G06F 9/44505 709/220 |
| 6,154,787 A * | 11/2000 | Urevig | G06F 9/5061 709/223 |
| 6,314,460 B1 * | 11/2001 | Knight | G06F 3/0626 709/212 |
| 6,324,654 B1 | 11/2001 | Wahl et al. | |
| 6,418,555 B2 | 7/2002 | Mohammed | |
| 6,687,817 B1 | 2/2004 | Paul | |
| 7,020,706 B2 | 3/2006 | Cates et al. | |

(Continued)

OTHER PUBLICATIONS

"U.S. Appl. No. 11/616,731, Advisory Action dated Mar. 17, 2011", 3 pgs.

(Continued)

*Primary Examiner* — James Trujillo
*Assistant Examiner* — Cheryl M Shechtman
(74) *Attorney, Agent, or Firm* — Schwegman Lundberg & Woessner, P.A.

(57) ABSTRACT

Various embodiments disclose a system and method to manage a configuration of a plurality of content switching devices in a networked system by generating a first configuration data file and translating the first configuration data file into one or more device specific configuration data files. Each device specific configuration data file corresponds to a device type of the plurality of content switching devices. Some embodiments of the system and method then communicate the one or more device specific configuration data files to each of the plurality of content switching devices of a corresponding device type to configure each content switching device. Other systems and methods are disclosed.

20 Claims, 6 Drawing Sheets

(56) References Cited

U.S. PATENT DOCUMENTS

| | | | |
|---|---|---|---|
| 7,500,158 B1 * | 3/2009 | Smith | H04L 12/2697 709/220 |
| 8,949,297 B2 | 2/2015 | Bigian et al. | |
| 2004/0123091 A1 | 6/2004 | Das | |
| 2005/0229238 A1 * | 10/2005 | Ollis | H04L 29/12254 726/4 |
| 2008/0162609 A1 | 7/2008 | Bigian et al. | |

OTHER PUBLICATIONS

"U.S. Appl. No. 11/616,731, Final Office Action dated Aug. 14, 2013", 29 pgs.

"U.S. Appl. No. 11/616,731, Final Office Action dated Sep. 23, 2011", 15 pgs.

"U.S. Appl. No. 11/616,731, Final Office Action dated Dec. 1, 2010", 15 pgs.

"U.S. Appl. No. 11/616,731, Non Final Office Action dated Jan. 7, 2013", 23 pgs.

"U.S. Appl. No. 11/616,731, Non Final Office Action dated May 21, 2014".

"U.S. Appl. No. 11/616,731, Non-Final Office Action dated Jun. 24, 2010", 15 pgs.

"U.S. Appl. No. 11/616,731, Notice of Allowance dated Oct. 3, 2014", 9 pgs.

"U.S. Appl. No. 11/616,731, Response filed Jan. 28, 2011 to Final Office Action dated Dec. 1, 2010", 11 pgs.

"U.S. Appl. No. 11/616,731, Response filed Feb. 22, 2012 to Final Office Action dated Sep. 23, 2011", 16 pgs.

"U.S. Appl. No. 11/616,731, Response filed May 7, 2013 to Non Final Office Action dated Jan. 7, 2013", 16 pgs.

"U.S. Appl. No. 11/616,731, Response filed Aug. 21, 2014 to Non Final Office Action dated May 21, 2014", 12 pgs.

"U.S. Appl. No. 11/616,731, Response filed Sep. 13, 2010 to Non Final Office Action dated Jun. 24, 2010", 11 pgs.

"U.S. Appl. No. 11/616,731, Response filed Nov. 14, 2013 to Final Office Action dated Aug. 14, 2013", 17 pgs.

"U.S. Appl. No. 14/611,217, First Action Interview—Office Action Summary dated Apr. 13, 2016", 5 pgs.

* cited by examiner

CONTENT SWITCH MANAGEMENT

PRIORITY

This application is a continuation of and claims the benefit of priority to U.S. patent application Ser. No. 11/616,731, filed on Dec. 27, 2006, and entitled "CONTENT SWITCH MANAGEMENT," now issued as U.S. Pat. No. 8,949,297, which is hereby incorporated by reference herein in its entirety.

TECHNICAL FIELD

This application relates to a method and system for managing content switching devices in a network system.

BACKGROUND

Network system applications, such as data retrieval systems (e.g., web-based item listing system, etc.), may receive and store large quantities of data. Often the data stored may be distributed over a multitude of data centers, each of which may be geographically distributed throughout a region. Additionally, the data centers may be assigned to store specific content data. For example, a first data center may be located in Miami, Florida and store data pertaining to automobile sale listings while a second data center in Seattle, Washington may store data pertaining to antique sale listings. This type of large data retrieval system requires a large architecture of devices for receiving and retrieving data throughout the system. The management of such a large configuration of devices is complicated by the use of various differing device types (e.g., make and model) in different regions but each sharing some or all functionality.

BRIEF DESCRIPTION OF THE DRAWINGS

Embodiments are illustrated by way of example, and not by way of limitation, in the figures of the accompanying drawings in which.

DETAILED DESCRIPTION

Although the present invention has been described with reference to specific example embodiments, it will be evident that various modifications and changes may be made to these embodiments without departing from the broader scope of the invention. Accordingly, the specification and drawings are to be regarded in an illustrative rather than a restrictive sense.

In various embodiments, a configuration of a plurality of content switching devices may be managed in a networked system by generating a first configuration data file and translating the first configuration data file into one or more device specific configuration data files, each device specific configuration file corresponding to a device type of the one or more content switching devices. The one or more device specific configuration data files may then be communicated to each content switching device of a corresponding device type to configure each content switching device.

Figure 1:
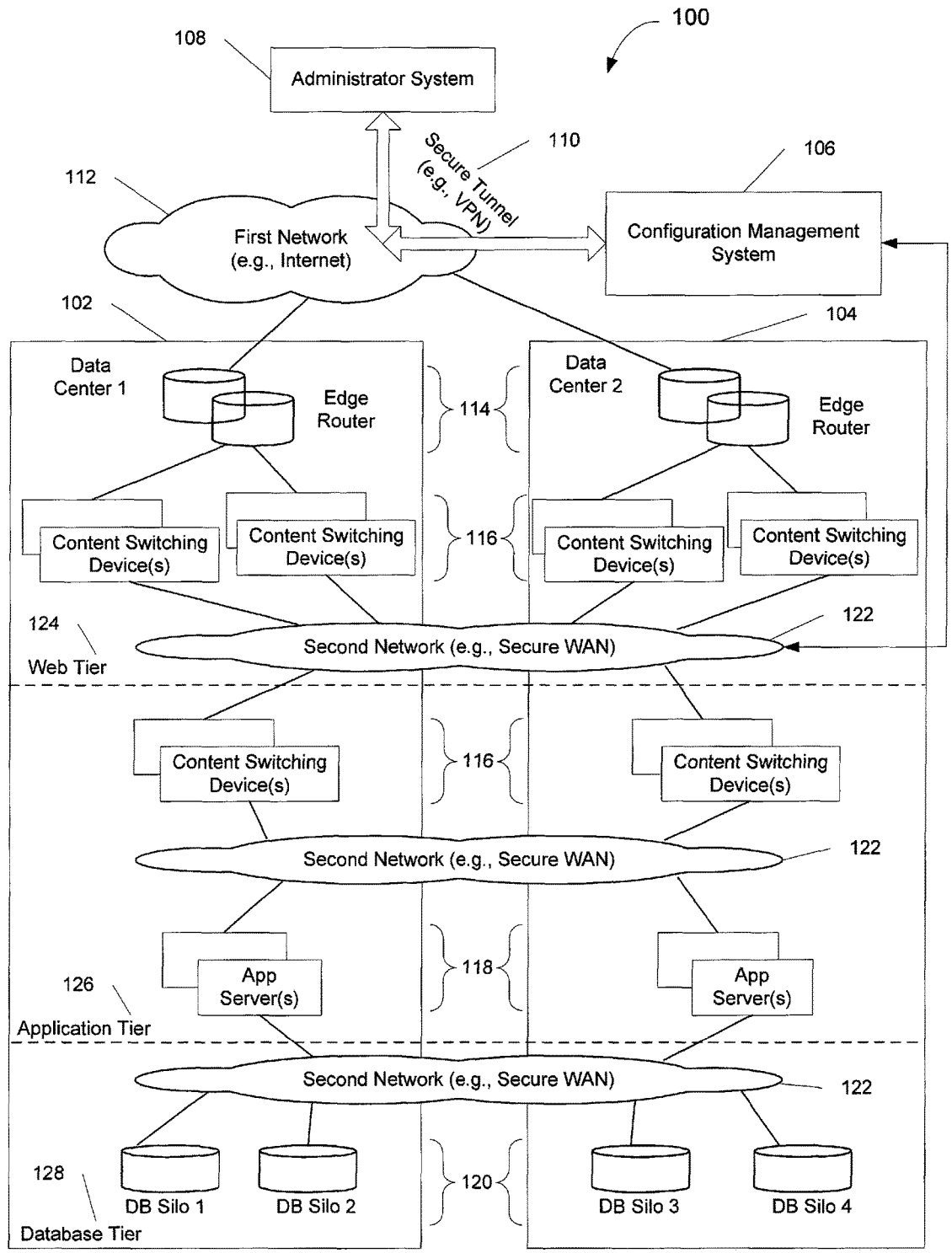
FIG. 1 is a diagram illustrating an example embodiment of components associated with a data retrieval system.

FIG. 1 is a diagram illustrating an example embodiment of components associated with a data retrieval system 100. The data retrieval system 100 includes a data center 102, a data center 104, a configuration management system 106 and an administrator system 108. An administrator using the administrator system 108 may be in communication with the configuration management system 106 using a secure tunnel 110 (e.g., a virtual private network (VPN)) through a first network 112 (e.g., the Internet).

The data center 102 and the data center 104 may include a multitude of devices, such as edge router(s) 114, content switching device(s) 116, application server(s) 118, and databases 120. The devices may be interconnected between the data centers and each other via a second network 122 (e.g., an Intranet, etc.). Each data center may include a web tier 124, an application tier 126, and a database tier 128 for handling the various functions within and between the data center 102 and 104, and the configuration management system 106.

The example embodiment of the data retrieval system 100 further illustrates the distribution of each device (e.g. content switching device(s) 116) within the tiers of each data center. For example, incoming data, such as a data request from a user (not shown), may flow through the first network 112 and into the tiers of the data center 102 or the data center 104. In one embodiment, the content switching device(s) 116 are configured to determine where the incoming data, or a response thereto, is to be passed next within or between the tiers of the data centers 102, 104. For example, the content switching device(s) 116 of the application tier 126 in data center 02 may derive a routing hint based on the content of the incoming data request. Based on that hint, the data may be routed through the second network 122 to the application server(s) 118 of the data center 104 and accordingly retrieve the requested data from the databases 120 of database tier 128 in the data center 104. In one embodiment, once retrieved the requested data may be communicated back to the data center 102 from the data center 104 in the reverse path using the application tier 126 and the second network 122. An example advantage in this embodiment is the data retrieved may be accessed from the database tier 128 of the data center 104 at a much faster rate through the application tier 126 than a similar exchange of data between data centers using only the database tier 128.

In one embodiment, the routing hint is a cookie received from the user indicating at which data center the requested data is located. In another embodiment, the routing hint is derived based on the context of the requested data. For example, the data retrieval system 100 may determine a request for automobile listings received in data center 102 should be rerouted to the application tier of the data center 104 to retrieve data from its corresponding database tier (e.g., DB Silo 3 or 4).

Although the data center 102 and the data center 104 may be physically and geographically separate from each other, the content switching device(s) 116 may be logically configured to include a pool representing a group of services managed by the content switching device(s) 116. In various embodiments, the content switching device(s) 116 may include various configuration entries representing physical and logical configurations for handling incoming network data from the first network 112 and the second network 122 as well as for retrieving data from databases 120. For example, configuration entries may include server, service, virtual server (VServer), content switching (CS) Vserver, load balancing (LB) Vserver, policies, expressions, and rules. The physical portion of the content switching device(s) 116 may be a server that represents the physical system and includes a hardware address identifiable on the first network 112 and the second network 122. It is these various configuration entries that may be managed, according to various embodiments, by the configuration management system 106 and is discussed in detail below.

Each content switching device(s) 116 may include one or more services. As mentioned above and discussed further below, a collection of services may be logically configured as a pool distributed amongst a group of content switching devices. A service may be a configuration entry on the content switching device(s) 116 representing a combination of an IP (Internet protocol) address and port number on the physical system that may be used as a forwarding address for incoming data (e.g. database request) from the edge router(s) 114. The content switching device(s) 116 may include one or more virtual server(s) (Vserver). In one embodiment, a Vserver is a configuration entry on the content switching device(s) 116 that represents a logical entity comprised of an IP address and port that may accept client connections (e.g., from a user) via the first network 112 and receive data requests.

In one embodiment, the CS Vserver is a configuration entry on the content switching device(s) 116 that represents a VServer with a content switching policy bound to it. The LB Vserver may be a configuration entry on the content switching device(s) 116 that is a logical entity that may be bound to a Vserver through a policy, has services bound to it, and may include a process to load balance across the services and optional weighting.

The policy may be a configuration entry on the content switching device(s) 116 that specifies the conditions on which the incoming data request may be sent to a LB Vserver. The expression may be a configuration entry on the content switching device(s) 116 that represents a simple condition evaluated by comparing the incoming data's qualifier with operand to the specified operator, where a qualifier identifies an object in the data request. In one embodiment, the rule is a configuration entry on the content switching device(s) 116 that represents a logical aggregation of a set of expressions. A logical configuration may then be a subset of the content switching device(s) 116 configuration that includes the CS Vserver, LB Vserver, server, services, policies, expressions, rules, and bindings.

In one embodiment, a logical configuration may be created when a CS Vserver is associated with a pool and the logical configuration may then be consistent across all CS Vserver(s) that are associated with the same pool. For example, the logical configuration may be consistent across the pool represented by the content switching device(s) 116 associated with the data center 102 and the data center 104. The content switching device(s) 116 of the application tier 126 may accept connections from internal internet protocol addresses and may be communicatively coupled to applications server(s) 118 as services bound to a LB VServer configuration entry.

Returning to the configuration management system 106, an administrator utilizing the administrator system 108 may securely log into the configuration management system 106 via the secure tunnel 110 to manage the data retrieval system 100 including the content switching device(s) 116. In various embodiments, this may include retrieving and discovering content device configurations (by group or individually) within the data retrieval system 100, tying the discovered configuration data to a template, grouping content switching devices according to the pools they manage, and creating, validating and pushing out new configurations to individual content switching devices or to the group. The configuration management system 106 may include one or more configuration management applications that may be used to manage the content switching device(s) 116 in the data center 102 and the data center 104. For example, the configuration management applications may provide a user (e.g., an administrator) with the functionality and a graphical user interface (GUI) to create a configuration file, validate the configuration and push the configuration file out to configure the content switching device(s) 116 of the data center 102 and the data center 104. Additional details of these example functions are illustrated and described below with reference to FIG. 4.

Figure 2:
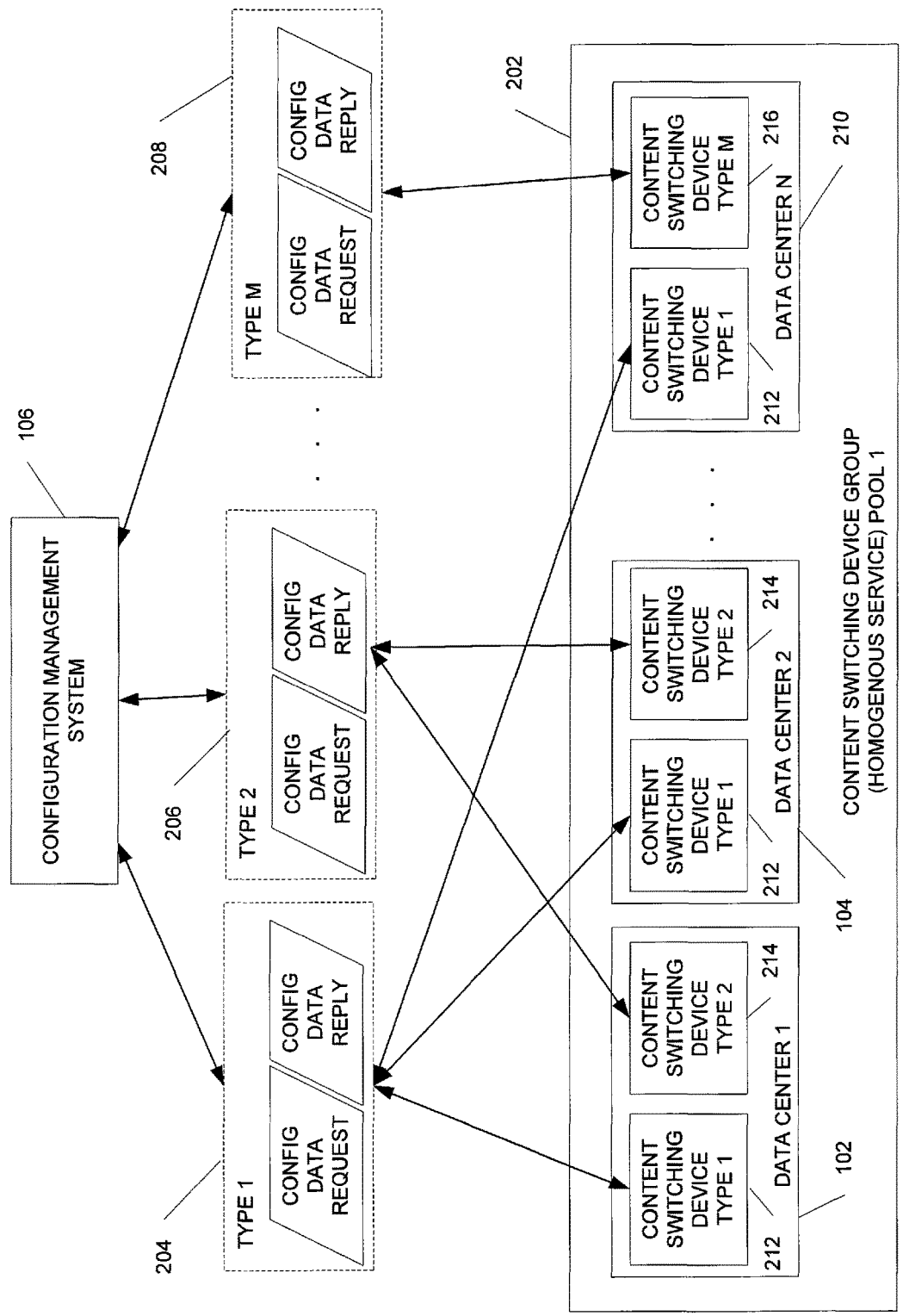
FIG. 2 is a diagram illustrating an example of using a configuration management system to discover, according to one embodiment, a current configuration of a group of content switching devices of different types associated with a pool.

FIG. 2 is a diagram illustrating an example of using the configuration management system 106 to discover, according to one embodiment, a current configuration of a group 202 of content switching devices (e.g., content switching device(s) 116) of different types associated with a given pool (e.g., pool 1). Similar to the pools discussed above, the pool may be associated with one or more homogenous services configured on each content switching devices in the group. For example, the pool may be associated with a configuration including a policy that determines routing paths based on routing hints as described above. However, it can be appreciated that many services may be included in a pool which may be common to the content switching devices of a group of content switching devices.

In one embodiment, the configuration management system 106 discovers each content switching device's configuration by sending out a configuration data request and receiving a reply including the configuration, as shown in respective blocks 204, 206, and 208 for types 1, 2, and type M, where M, represents a number of different types (e.g., manufacture, model, etc.) of content switching devices that may be included in a group of content switching devices associated with a pool.

Additionally, the content switching devices of the group 202 may also be located in different data centers (e.g., data centers 1 to N). For example, the group 202 for pool 1 includes content switching device 212 of type 1 and content switching device 214 of type 2 in the data centers (1) 102 and 104 (2), and content switching device 216 of type M from data center (N) 210. Each type of content switching device requires a request in its device specific format (e.g., syntax and commands). So the configuration management system 106 in block 204 will send the configuration data request for type 1 content switching devices to each data center including a content switching device of type 1. A similar process if followed for device types 2-M. In one embodiment, the configuration management system 106 may, transparent to the administrator system 108, utilize APIs (application program interface) specific to each content switching device type. For example, the configuration management system 106 may translate a generic set of commands and data identifiers (e.g., fetch, config data, etc.) in a generic configuration file generated by the administrator system 108 into the specific device type commands and data structures/names in a device specific configuration data file to communicate to each device transparent to the administrator.

Figure 3:
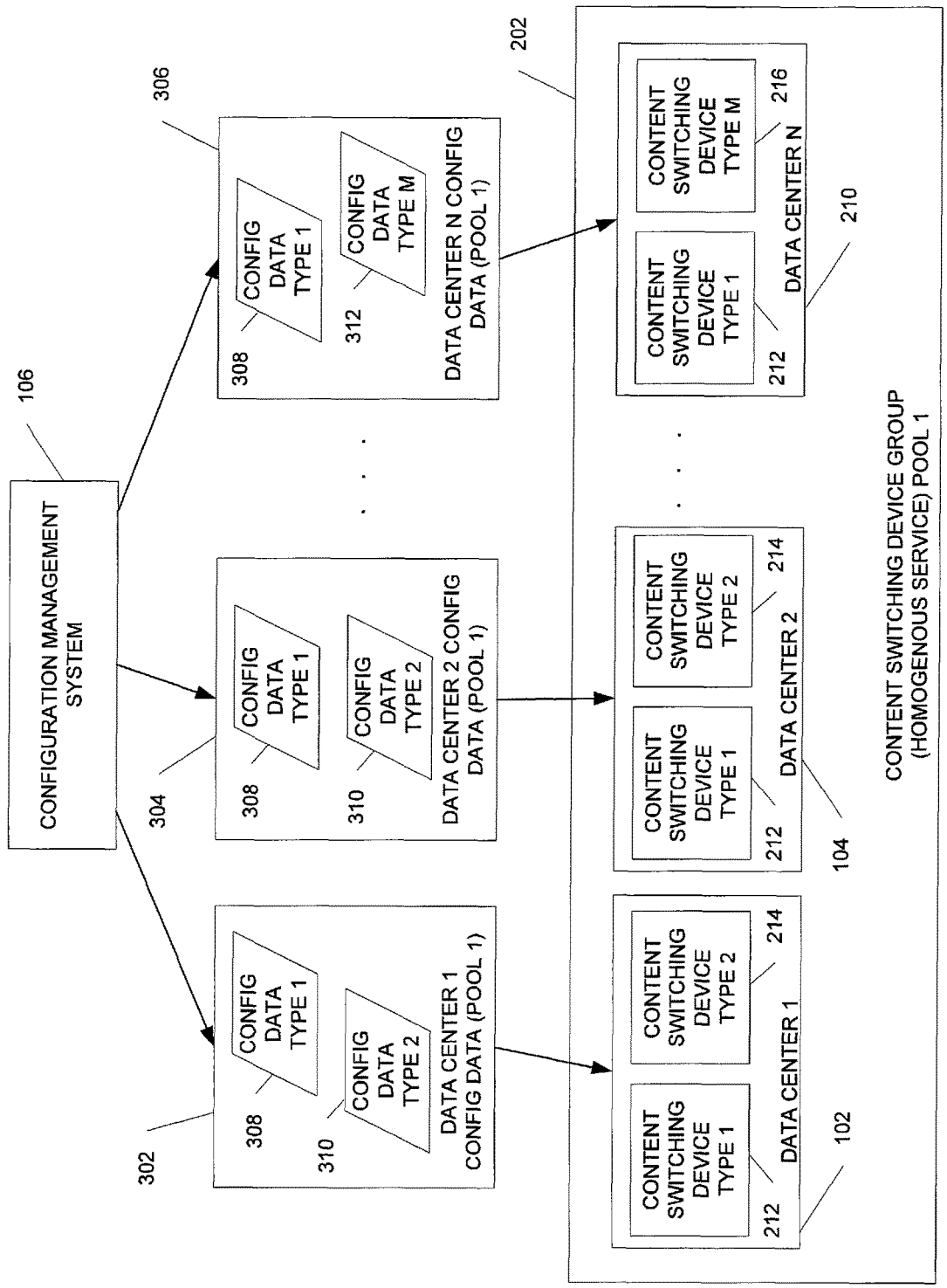
FIG. 3 is a diagram illustrating an example of a group of content switching devices that may be configured, according to an example embodiment, using a configuration management system to push out a new configuration to the content switching devices in a group.

FIG. 3 is a diagram illustrating an example of a group of content switching devices that may be configured, according to an example embodiment, using the configuration management system 106 to push out a new configuration to the content switching devices in the group 202. In one embodiment, after the configuration management system 106 receives the configuration information from each type as described with reference to FIG. 2, it may generate a new device specific configuration data file to push out to each device type.

In one embodiment, the configuration management system 106 may be used to configure or reconfigure the group 202 of content switching devices of various types in various data centers using configuration data bundled into blocks 302, 304, and 306, each respectively associated with data center (1) 102, data center 104 (2), and data center (N) 210. In one embodiment, the new device specific configuration data file pushed out may be translated by the configuration management system 106 from a generic configuration file created by the administrator from one or more discovered configurations that have been tied and optionally merged by the configuration management system 106 into one or more templates (not shown). As discussed with reference to device types 1-M of FIG. 2, the content switching devices in each data center for a given pool may include a multitude of different types of content switching devices. For example, the content switching devices may be differentiated by manufacturer (e.g. load balancers such as NetScaler®, Cisco®, F5®, etc.), model, and so on.

In one embodiment, the configuration management system 106 may create and communicate configuration data based on the content switching device group type and what data center the content switching device is located. For example, the configuration management system 106 may create a configuration data file 308 for type 1, a configuration data file 310 for type 2, and a configuration data file 312 for type M. The configuration management system 106 may then, as illustrated in blocks 302 and 304, communicate the configuration data file 308 and the configuration data file 310 to the data centers 102 and 104 to configure the content switching device 212 and 214 corresponding to types 1 and 2. Similarly, the configuration management system 106 may, as illustrated in block 306, communicate the configuration data file 308 and the configuration data file 312 to the data center 210 to configure the content switching devices 212 and 216 corresponding to types 1 and M. Similar to what was discussed in FIG. 2, the configuration management system 106 may, transparent to the administrator system 108, utilize APIs (application program interface) specific to each content switching device type to create and communicate the device specific configuration data file to each device type based on an administrator created generic configuration data file.

Figure 4:
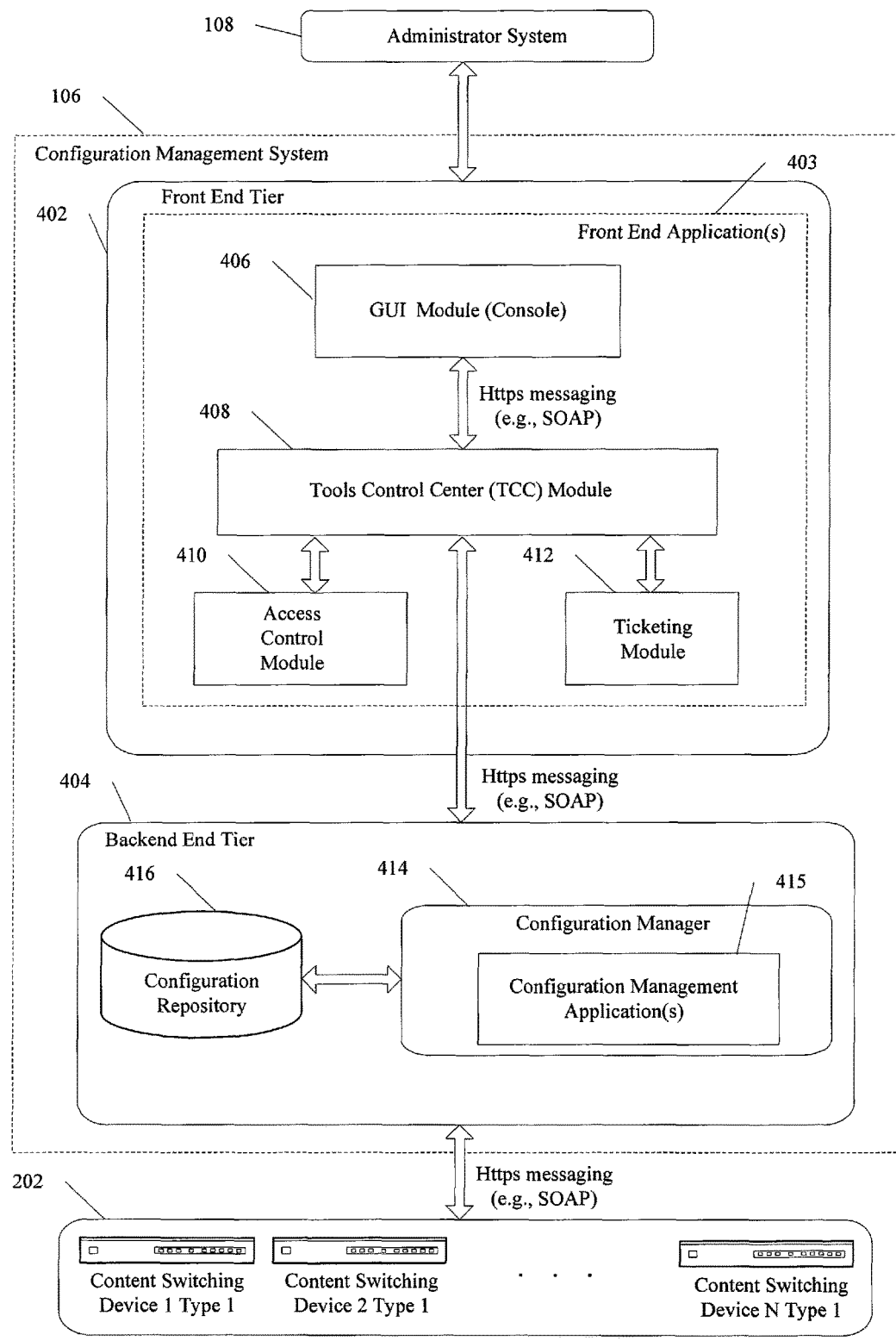
FIG. 4 is a block diagram illustrating an example embodiment of a multi-tier architecture of a configuration management system.

FIG. 4 is a block diagram illustrating an example embodiment of a multi-tier architecture of the configuration management system 106. In one embodiment, the configuration management system 106 includes two tiers, a front end tier 402 and a backend tier 404 that, inter alia, may be used to discover and push out configuration data to a group or individual content switching devices as discussed with reference to FIGS. 2 and 3.

The front end tier 402 includes front end application(s) 403 composed of a GUI (graphical user interface) module 406, a TCC (tools control center) module 408, an access control module 410, and a ticketing module 412. In one embodiment, the GUI module 406 provides a browser-based user interface console for the administrator (e.g., using administrator system 108) who may interact with the configuration management system 106 to configure and manage the layer seven routing constructs that may be deployed on a group of content switching devices. The GUI module 406 may provide configuration and web gateway management through an https using a messaging protocol (e.g., SOAP (Simple Object Access Protocol)) to create a trusted connection with the TCC module 408, which in turn establishes a similar trusted connection to the backend tier 404. The backend tier 404 includes a configuration manager 414 including configuration management application(s) 415, and a configuration repository 416. For simplicity, the functions and processes performed by the configuration management application(s) 415 and its associated modules (not shown) are referenced as being performed hereafter by the configuration manager 414.

In one embodiment, upon a successful authentication, a trusted connection is established with a token which may be used throughout the login session or until the token expires. Fine grain access control may be setup using the access control module 410 so that each operation going through the GUI module 406 console may be be authorized. The ticketing module 412 may be primarily used to record what comes in or what goes out of the system. For example, it may be used to record, track, and provide approval (e.g., via a ticket) to the administrator for distribution and versioning of new configurations for content switching devices.

The configuration manager 414 may provide a web service interface to support the GUI module 406 console, and is designed to interact with the content switching devices of the group 202 independent of the content switching device type. In one embodiment, a SOAP API (application program interface) is defined to support editing, versioning and deployment requests from the GUI module 406. The communications from the TCC module 408 to the configuration manager 414 and from the configuration manager 414 to the content switching devices of the group 202, as mentioned above, may be carried out as https connections.

In various embodiments, the configuration manager 414 may provide a number of functions and services related to managing and configuring content switching devices, such as those in the group 202. These may include configuration file generation based on a configuration file created by an administrator, content switching device management, pool configuration management, configuration validation, and configuration versioning.

Content switching device configuration includes general management functions and configuration discovery and download functions. The general management functions include functions that may be managed through the console generated by the GUI module 406. From the console, the administrator of the administrator system 108 may view a group (e.g., group 202) of context switching devices including their system information, view the policies that are associated with the LB Vservers for a given context switching device (in or out of a group), view the CS Vservers and the LB Vservers that are associated with each pool managed by the context switching device, view the deployed configuration version of each pool managed by a context switching device. Additionally, the functionality includes the ability to add a new CS Vserver for a managed pool on a context switching device, add a new LB Vserver for a managed pool on a context switching device, set alert thresholds per service on a LB Vserver and set alert thresholds per CS vserver binding, and modify and publish load-balancing weights of a managed pool on a context switching device.

In one embodiment, as discussed above with reference to FIG. 2, the new one or more configurations may be discovered from a group of devices associated with a pool. The configurations may be received in a raw data format. The configuration manager 414 may then associate the discovered raw configuration data to one or more templates (not shown). The templates may provide a meaningful framework to verify, validate, and optionally edit the structure of the discovered configuration data prior to being pushed out to configure other content switching devices. In an example embodiment, the discovered configuration data is raw XML (extensible markup language) data and the template is an XML template. It can appreciated, however, that many different language types may be used for the configuration data and associated templates.

The download functions may include such functions as registering new content switching devices. When registering a new content switching device, the configuration manager 414 attempts to discover the new content switching device on the network. If it is found to exist, the content switching device's name and configuration may be fetched from the content switching device and stored in the configuration repository 416. Otherwise, the provided information may be used to complete the registration and the content switching device remains in a 'new' state (offline). The configuration of the new web gateway may then be downloaded at a later time via a direct request from the console in conjunction with the GUI module 406.

Pool configuration management may include general operations and functions including publishing content switching device configurations. From the console generated by the GUI module 406 in conjunction with the configuration manager 414, an administrator may bind a policy to a CS/LB Vserver, view the binding of CS, LB, services and servers for a pool, view a list of content switching devices that support a selected pool, which may provide the administrator a sense of which content switching devices will be impacted when a selected pool configuration is modified, publish a logical configuration for a selected pool to one or more content switching devices, removal of policies, expressions, and view a deployed configuration for each pool in each content switching device.

If the configuration manager 414 upon receiving a request to publish a configuration checks to see if the targeted content switching device is available for deployment, such as by sending a command and receiving a reply. If it is, the configuration manager 414 will reserve the targeted content switching device (e.g., suspend normal operations), query the targeted content switching device for the existing services, expressions, policies, and CS, LB Vserver and server information. The configuration manager 414 will validate the live and the deployed configurations. If there is a mismatch, according to one embodiment, the deployment may immediately cease with an error since the mismatch may signify a change on the live configuration without the knowledge of configuration manager 414 and administrator. The configuration manager 414 will validate the approved and the last deployed configurations. In one embodiment, if there is a mismatch in the services, CS, LB Vservers, and server information, the differences are presented to the administrator and an approved configuration may be used to replace what is currently on the content switching device. Additionally, the configuration manager 414 may backup the current configuration on the content switching device and deploy any new expressions and policies using a new configuration version.

The configuration manager 414 upon administrator request or at predetermined time intervals may manage various types of configuration validations such as on demand validation and implicit validation. On demand and implicit validations may be available during configuration edits and before configuration deployments, respectively. A validation ensures that the required services, servers, CS and LB Vservers exist and are consistent between the repository and the content switching device.

In one embodiment, on demand validation includes the configuration manager 414 validating live by comparing against the last deployment. This validates a live configuration running on a content switching device against the last deployed configuration in the configuration repository 416 for a selected pool. This validation may also detect the situations when changes were made to the live configuration without the administrator's or the configuration management system's 106 knowledge. The configuration manager 414 in response to a mismatch may create a report detailing the comparison.

Another on demand validation may be a validation across one or more content switching devices. This validation may detect a condition in which a group of content switching devices associated with a pool's configuration version is out-of-synch across the content switching devices. In one embodiment, if this occurs during a logical configuration edit, changes may be made to the logical configuration that is consistent across the content switching devices and the users are presented with a list of content switching devices that have an inconsistent logical configuration for a selected pool.

The configuration manager 414 may also validate a current configuration against the last deployed, where a current configuration may refer to the configuration before it is deployed. This validation process validates the current configuration against the last deployed configuration in the configuration repository 416. The process also compares and identifies the differences, and if possible reconciles the differences according to at least one of an administrator choice, the current configuration data file from the content switching device, and the configuration data file as stored in the configuration repository 416. In one embodiment, if there's a mismatch of any of the services, servers, CS and LB Vservers between these environments, the configuration from the configuration repository 416 may be assumed to be the correct one with the approval of the administrator.

Figure 5:
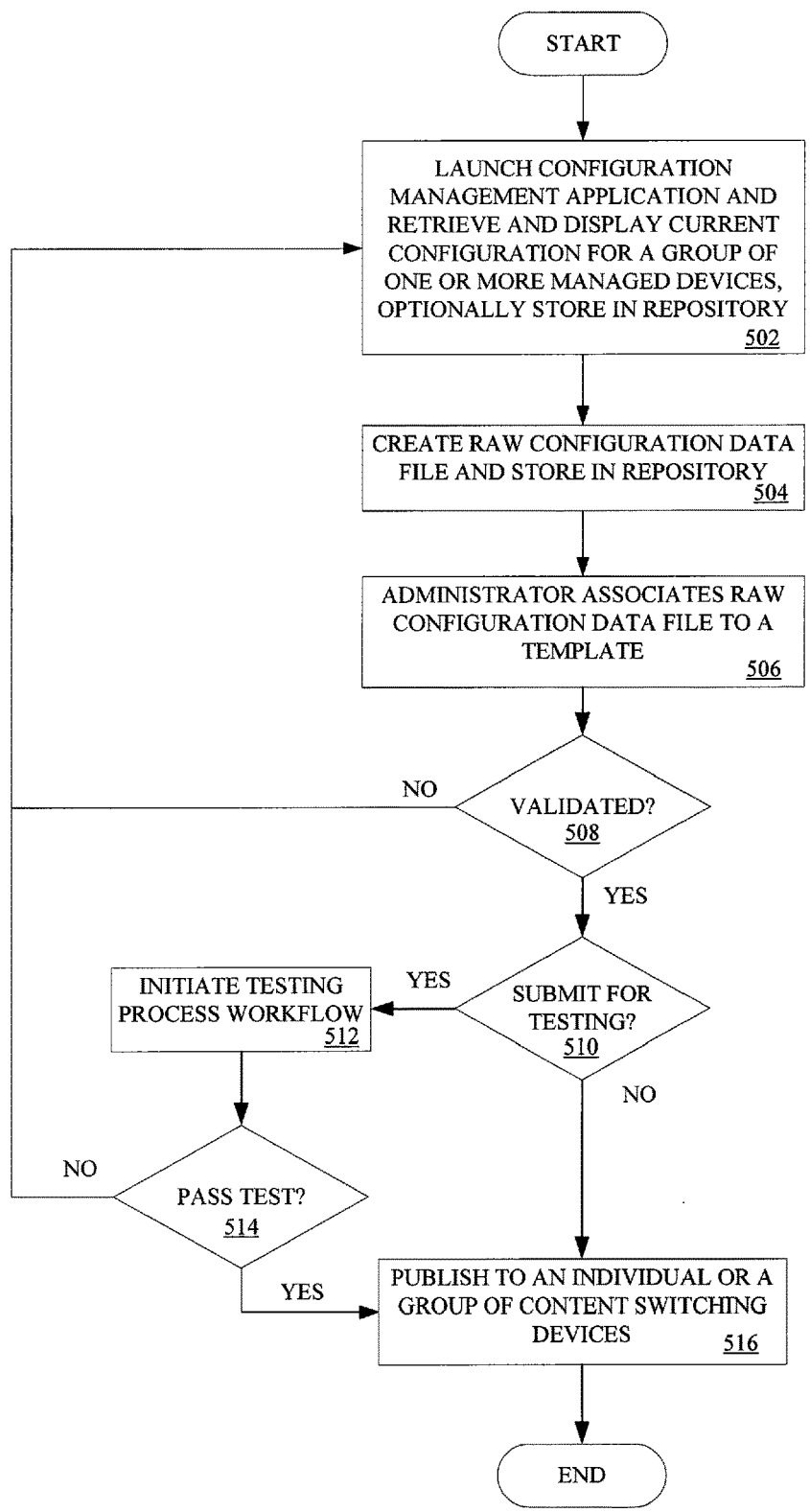
FIG. 5 is a flowchart illustrating an example embodiment of a high level process using a configuration manager to manage one or more configurations associated with content switching devices in the data retrieval system.

FIG. 5 is a flowchart illustrating an example embodiment of a high level process using a configuration manager to manage one or more configurations associated with content switching devices (e.g., content switching devices 116) in the data retrieval system 100. The process begins at operation 502 where the configuration manager is launched by an administrator to retrieve and provide to the administrator current raw configuration data for an individual or group of content switching devices. The raw configuration data may be stored in a configuration repository (e.g., configuration repository 416). At operations 504 and 506, a raw configuration data file is created from the retrieved configuration data and the data file is associated with a template as described above with reference to FIG. 4. In one embodiment, the raw configuration data file is stored in the configuration repository.

The configuration management system at operation 508 may then validate the configuration data file as described above with reference to FIG. 4. If at operation 508 the configuration data file cannot be validated, the process may return to operation 502 where the administrator may try again to retrieve, create and validate a configuration. If, however, at operation 508 the configuration data file is validated, the configuration data file at operation 510 may optionally be submitted for testing and ticketing. If submitted for testing, a process workflow for testing and ticketing is begun at operation 512. If the configuration passes at operation 514, the administrator may publish the configuration data to an individual or a group of content switching devices at operation 516. However, if it fails the testing at operation 514 the process may return to operation 502 to begin again. Returning to operation 510, if the administrator elects not to submit for testing (e.g., republishing a tested version or an emergency fix), the process proceeds to operation 516 as discussed above.

Figure 6:
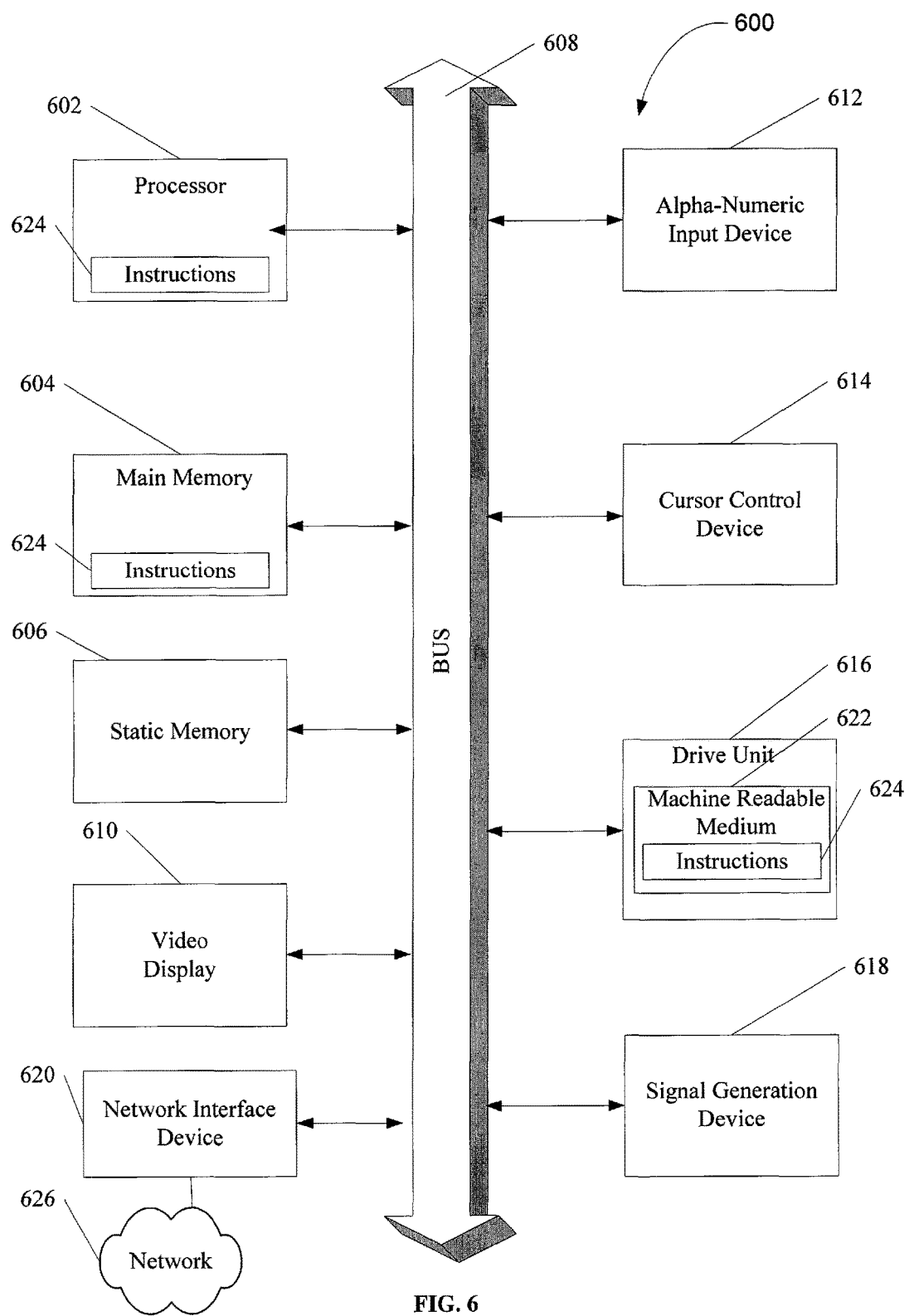
FIG. 6 shows a diagrammatic representation of machine in the example form of a computer system within which a set of instructions may be executed causing the machine to perform any one or more of the methodologies discussed herein.

FIG. 6 shows a diagrammatic representation of machine in the example form of a computer system 600 within which a set of instructions may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions and data structures (e.g., software 624) embodying or utilized by any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may further be transmitted or received over a network 626 via the network interface device 620 utilizing any one of a number of well-known transfer protocols (e.g., HTTP).

While the machine-readable medium 622 is shown in an example embodiment to be a single medium, the term "machine-readable medium" should be taken to include a single medium or multiple media (e.g., a centralized or distributed database, and/or associated caches and server(s)) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

We claim:

1. A method of managing a configuration of a plurality of content switching devices, the method comprising:
   creating a first configuration data file;
   discovering a plurality of private network addresses for a set of internal content switching devices of the plurality of content switching devices, each internal content switching device of the set of internal content switching devices associated with a respective private network address of the plurality of private network addresses;
   discovering a plurality of public network addresses for a set of public network-facing content switching devices of the plurality of content switching devices, each public network-facing content switching device of the set of public network-facing content switching devices associated with a respective public network address of the plurality of public network addresses;
   translating, using at least one hardware-based processor, the first configuration data file into a plurality of device specific configuration data files, each device specific configuration data file corresponding to a device type of each of the set of internal content switching devices and the set of public network-facing content switching devices, and corresponding to a data center in which each device type is located, the plurality of device specific configuration data files including physical and logical configurations for handling data;
   validating each of the device specific configuration data files corresponding to each of the plurality of content switching devices by comparing a last deployed one of a plurality of device specific configuration data files to a current version of the last deployed one of the device specific configuration data files; and
   communicating, in response to the validating, a respective one of the plurality of device specific configuration data files to each content switching device of a corresponding device type to configure each of the set of internal content switching devices and the set of public network-facing content switching devices.

2. The method of claim 1, further comprising determining a current configuration of each of the plurality of content switching devices.

3. The method of claim 2, further comprising determining whether there are differences between a respective one of the current configuration of each of the plurality of content switching devices and a translated version of a corresponding one of the plurality of device specific configuration data files.

4. The method of claim 2, further comprising storing the current configuration of each of the plurality of content switching devices in a data repository.

5. The method of claim 1, further comprising:
sending a configuration data request to each of the plurality of content switching devices; and
receiving a reply from each of the plurality of content switching devices.

6. The method of claim 1, further comprising, prior to the communicating of the respective one of the plurality of device specific configuration data files to each of the plurality of content switching devices, determining whether a targeted one of the plurality of content switching devices is available.

7. The method of claim 1, further comprising, prior to the communicating the respective one of the plurality of device specific configuration data files to each of the plurality of content switching devices, registering a new content switching device of a specific device type.

8. The method of claim 1, further comprising querying each of the plurality of content switching devices for existing services, expressions, and policies of each of the plurality of content switching devices.

9. The method of claim 1, further comprising:
validating each of the device specific configuration data files corresponding to each of the plurality of content switching devices; and
ceasing communication of the device specific configuration data file to a particular one of the plurality of content switching devices based on a mismatch determined from the validation.

10. The method of claim 1, further comprising managing a configuration of a plurality of load balancers to balance incoming web data.

11. A system, comprising:
one or more processors; and
memory including instructions that, when executed by the one or more processors, cause the system to:
create a first configuration data file;
discover a plurality of private network addresses for a set of internal content switching devices of the plurality of content switching devices, each internal content switching device of the set of internal content switching devices associated with a respective private network address of the plurality of private network addresses;
discover a plurality of public network addresses for a set of public network-facing content switching devices of the plurality of content switching devices, each public network-facing content switching device of the set of public network-facing content switching devices associated with a respective public network address of the plurality of public network addresses
translate the first configuration data file into a plurality of device specific configuration data files, each device specific configuration data file corresponding to a device type of each of the set of internal content switching devices and the set of public network-facing content switching devices, and corresponding to a data center in which each device type is located, the plurality of device specific configuration data files including physical and logical configurations for handling data;
validate each of the device specific configuration data files corresponding to each of the plurality of content switching devices by comparing a last deployed one of a plurality of device specific configuration data files to a current version of the last deployed one of the device specific configuration data files; and
communicate, over the secure tunnel, a respective one of the plurality of device specific configuration data files to each content switching device of a corresponding device type to configure each of the set of internal content switching devices and the set of public network-facing content switching devices.

12. The of claim 11, wherein the instructions further cause the system to:
determine a current configuration of each of the plurality of content switching devices; and
determine whether there are differences between a respective one of the current configuration of each of the plurality of content switching devices and a translated version of a corresponding one of the plurality of device specific configuration data files.

13. The system of claim 11, wherein the instructions further cause the system to:
send a configuration data request to each of the plurality of content switching devices; and
receive a reply from each of the plurality of content switching devices.

14. The system of claim 11, wherein the instructions further cause the system to:
determine a current configuration of each of the plurality of content switching devices; and
store the current configuration of each of the plurality of content switching devices in a data repository.

15. A computer-readable medium having no transitory signals and including a plurality of instructions that, when executed by one or more processors, causes at least one of the one or more processors to perform operations of managing a configuration of a plurality of content switching devices, the operations comprising:
creating a first configuration data file;
discovering a plurality of private network addresses for a set of internal content switching devices of the plurality of content switching devices, each internal content switching device of the set of internal content switching devices associated with a respective private network address of the plurality of private network addresses;
discovering a plurality of public network addresses for a set of public network-facing content switching devices of the plurality of content switching devices, each public network-facing content switching device of the set of public network-facing content switching devices associated with a respective public network address of the plurality of public network addresses;
translating the first configuration data file into a plurality of device specific configuration data files, each device specific configuration data file corresponding to a device type of each of the set of internal content switching devices and the set of public network-facing content switches, and corresponding to a data center in which each device type is located, the plurality of device specific configuration data files including physical and logical configurations for handling data;

validating each of the device specific configuration data files corresponding to each of the plurality of content switching devices by comparing a last deployed one of a plurality of device specific configuration data files to a current version of the last deployed one of the device specific configuration data files; and communicating a respective one of the plurality of device specific configuration data files to each content switching device of a corresponding device type to configure each of the set of internal content switching devices and the set of public network-facing content switching devices.

16. The computer-readable medium of claim 15, wherein the operations further comprise determining a current configuration of each of the plurality of content switching devices.

17. The computer-readable medium of claim 16, wherein the operations further comprise determining whether there are differences between a respective one of the current configuration of each of the plurality of content switching devices and a translated version of a corresponding one of the plurality of device specific configuration data files.

18. The computer-readable medium of claim 16, wherein the operations further comprise storing the current configuration of each of the plurality of content switching devices in a data repository.

19. The computer-readable medium of claim 15, wherein the operations further comprise:

sending a configuration data request to each of the plurality of content switching devices; and receiving a reply from each of the plurality of content switching devices.

20. The computer-readable medium of claim 15, wherein the operations further comprise, prior to the communicating of the respective one of the plurality of device specific configuration data files to each of the plurality of content switching devices, registering a new content switching device of a specific device type.

* * * * *

UNITED STATES PATENT AND TRADEMARK OFFICE
CERTIFICATE OF CORRECTION

PATENT NO. : 10,257,027 B2
APPLICATION NO. : 14/611217
DATED : April 9, 2019
INVENTOR(S) : Armond Bigian et al.

Page 1 of 1

It is certified that error appears in the above-identified patent and that said Letters Patent is hereby corrected as shown below:

In the Claims

In Column 11, Line 29, in Claim 7, delete "communicating" and insert -- communicating of --, therefor.

In Column 12, Line 20, in Claim 12, delete "of" and insert -- system of --, therefor.

Signed and Sealed this
Twenty-first Day of July, 2020

Andrei Iancu
*Director of the United States Patent and Trademark Office*